United States Patent [19]

Matthews et al.

[11] Patent Number: 5,363,391
[45] Date of Patent: Nov. 8, 1994

[54] CONDUCTIVE FACE-COOLED LASER CRYSTAL

[75] Inventors: Steven C. Matthews, Pacific Palisades; James S. Sorce, Torrance; Mario P. Palombo, Manhattan Beach, all of Calif.

[73] Assignee: Hughes Aircraft Company, Los Angeles, Calif.

[21] Appl. No.: 874,270

[22] Filed: Apr. 24, 1992

[51] Int. Cl.⁵ .............................................. H01S 3/045
[52] U.S. Cl. .................................... 372/36; 359/326; 372/21; 372/34; 372/66
[58] Field of Search ................... 372/36, 34, 35, 21, 372/69, 72, 108, 66, 22; 359/326

[56] References Cited

U.S. PATENT DOCUMENTS

| | | | |
|---|---|---|---|
| 4,048,515 | 9/1977 | Liu | 307/88.3 |
| 4,563,763 | 1/1986 | Kuhn | 372/35 |
| 4,847,851 | 7/1989 | Dixon | 372/75 |
| 5,128,953 | 7/1992 | Macken | 372/34 |
| 5,181,215 | 1/1993 | Sam et al. | 372/34 |
| 5,187,714 | 2/1993 | Okazaki et al. | 372/36 |

FOREIGN PATENT DOCUMENTS 0296512  12/1988  European Pat. Off.

OTHER PUBLICATIONS

M. Reed,. et al, "Static Gas Conduction Cooled Slab Geometry Nd:Glass Laser", IEEE Journal of Quantum Electronics, vol. QE–21, No. 5 May 1985, pp. 412–414.

*Primary Examiner*—James W. Davie
*Attorney, Agent, or Firm*—Hugh P. Gortler; M. W. Sales; W. K. Denson-Low

[57] ABSTRACT

A technique for passively removing heat from an optical element in a laser system through its optically transmissive faces. Heat is removed by way of optically transmissive heat sinks or other heat conducting media disposed adjacent the optically transmissive surfaces of the optical element. Heat is transferred out of the optical element in a direction parallel to the direction of propagation of energy, thus minimizing problems associated with thermal gradients. Devices employing optical elements such as nonlinear frequency conversion crystals and laser crystals may utilize the heat management approach of the present invention to achieve better performance. Heat is transferred to the heat conducting media by direct contact, or through narrow gas-filled gaps disposed between the optical element and the heat conducting media.

18 Claims, 1 Drawing Sheet

CONDUCTIVE FACE-COOLED LASER CRYSTAL

BACKGROUND

The present invention relates generally to cooling techniques for optical elements employed in laser systems, and more particularly, to conductive face-cooled optical elements for use in laser systems.

The process of frequency conversion in a nonlinear laser material generates heat within the nonlinear material medium due to absorption. This heat must be removed if the frequency converter is to operate efficiently at a significant power level. Also, the process of storing energy in a solid state laser amplifier material also generates heat within the laser medium that must be removed, especially if the amplifier is to operate at a significant input power.

A traditional method of heat removal in solid state crystalline materials employed in laser systems is to remove the heat from the sides of the materials, in a direction transverse to the direction of laser energy propagation. The removal of heat in a transverse direction causes thermal gradients in this direction. This creates two problems. The first problem is that thermal-optical stress and index variations cause thermal aberrations that distort the laser beam. The second problem is that, in most frequency conversion materials, for example, the temperature variation in a direction transverse to the direction of propagation of the laser beam must be maintained to within a very small tolerance range. The presence of a thermal gradient in this direction severely limits the aperture size and the power loading allowed in a laser system design. Transverse cooling is described in a paper entitled "The Potential of High-Average-Power Solid State Lasers," by J. L. Emmett et al., Document No. UCRL-53571, dated Sep. 25, 1984, available from the National Technical Information Service.

Conventional beam shaping techniques have been used to cool crystals whereby the laser beam is optically flattened in one direction. This allows the crystal to be cooled along a greater length, and reduces the path from the center of the beam to the edge of the crystal where it is cooled. However, this method is not practical in all applications, and mates a relatively high degree of complexity in the associated optics.

In some crystalline materials, and in particular β-barium borate (BBO), the direction of greatest thermal conductivity in the material is also aligned closely with direction of optical propagation. In order to efficiently remove heat from materials with this property, the heat must therefore be removed from the optical faces. One method of face cooling is a convective process, normally achieved using a flowing gas. In this method, a gas is forced at high velocity across the faces of the crystal. The chief disadvantage of this method is that it requires a complex, active cooling system, and is therefore less suitable for applications requiring low cost, weight and volume, and a high degree of reliability. Also the engineering is complex because the gas flow across the optical surfaces must be very uniform to avoid optical distortion.

Therefore, it would be an advance in the art to have a heat removal technique that removes heat from the optical faces of a laser crystal or other optical element in a direction parallel to the beam path, and does it in a completely passive way.

SUMMARY OF THE INVENTION

The present invention addresses the above-noted difficulties by passively removing heat from the optical faces of an optical element, such as a laser amplifying crystal or a nonlinear frequency conversion crystal, in a direction parallel to the beam path. The optical element is cooled by conduction to adjacent heat conducting media through the optical surfaces that constitute the element's clear aperture. The heat is transferred to the heat conducting media by direct contact, or as was demonstrated in an embodiment of the present invention that was reduced to practice, through narrow gas-filled gaps.

More specifically, and with reference to one disclosed embodiment, the present invention provides for an optical device for use in a laser system that comprises a heat conducting housing, and an optically transmissive optical element having first and second surfaces that is disposed in the housing. Laser energy developed by the laser system propagates in a direction generally transverse to the plane of the first and second surfaces. First and second optically transmissive windows are provided that comprise optically transmissive heat sinks. Each window has a surface that is disposed in contact with, or closely adjacent to, respective first and second surfaces of the optically transmissive optical element. The resultant structure is such that heat generated in the optical element is conducted to the first and second optically transmissive windows in a direction parallel to the direction of laser energy propagation and then to the housing. Thermal gradients formed in the optical element are formed parallel to the direction of laser energy propagation and thus minimizes thermal gradient related problems associated with conventional optical designs.

The present invention thus provides a technique for passive heat removal from a nonlinear frequency conversion crystal or from a laser crystal through their optical transmissive faces. Heat is removed by optically transmitting heat sinks disposed adjacent the optical surfaces of the crystal. The heat is transferred out of the crystal in a direction parallel to the direction of propagation of energy, thus minimizing problems associated with thermal gradients.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
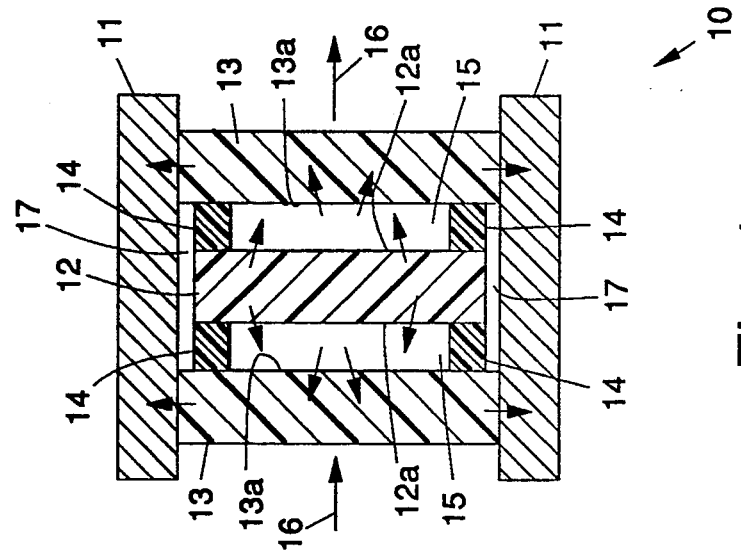
FIG. 1 illustrates a portion of an optical system that incorporates conductive face cooling in accordance with the principles of the present invention.

Referring to the drawing figures, FIG. 1 illustrates a portion of an optical system 10 that incorporates conductive face cooling in accordance with the principles of the present invention. FIG. 1 is not drawn to scale.

More specifically, FIG. 1 shows a portion of a laser system 10 that incorporates a laser crystal 12 that is secured in an aluminum or other metal housing 11. It is to be understood that the laser crystal 12 may be any optical element that is employed in the laser system 10, and may include a laser crystal or a nonlinear frequency conversion crystal, for example. The housing 11 may also be made of heat conducting materials other than metal.

The present invention provides a technique for cooling the laser crystal 12 or nonlinear harmonic generation crystal, for example, such as a KTiOPO$_4$ (KTP) crystal, whereby the crystal 12 is cooled using heat conduction to adjacent heat conducting media 13 through optical surfaces 12a that constitute its clear aperture. Typical heat conducting media 13 may comprise sapphire optical windows, for example. The heat may be transferred (illustrated by the arrows) to the heat conduction media 13 by direct contact whereby the laser crystal 12 is placed in contact with adjacent surfaces 13a of each of the heat conducting media 13. Alternatively, as was demonstrated in an embodiment of the present invention that was reduced to practice, heat may be transferred through a narrow gas-filled gap 15 disposed between the optical surfaces 12a and each of the adjacent heat conducting media 13. The gas-filled gap is typically on the order of 0.00025 inches in thickness. The gas employed in the gap 15 may be filled with air or hydrogen, or other suitable gas, depending upon the laser operating wavelength. The gap 15 may be formed by placing an O-ring, dielectric spacer, or shim 14 between the crystal 12 and the heat conducting media 13. The dielectric spacer may be formed by depositing a thin film onto the surface of the heat conducting media 13. The crystal 12 does not directly contact the housing 11, as is shown in FIG. 1 by the gaps 17 between the upper and lower edges of the crystal 12 and the adjacent portions of the housing 11.

The advantage of using the narrow gas-filled gap 15 is that the surfaces 12a, 13a do not contact, and thus there is no risk of damage to the optical surfaces 12a, 13a during the assembly process, and anti-reflection coatings on the optical surfaces 12a, 13a function in a normal manner. The gap 15 may be formed by placing thin shims 14 or spacers between the laser crystal 12 and the heat-conducting media 13. The gap 15 may also be formed by vacuum depositing a dielectric film (0.00025 inches thick) at selected locations on the heat-conducting media 13 or around the entire perimeter thereof where the crystal 12 contacts the heat-conducting media 13. Additionally, the gaps 15 may be formed by vacuum depositing the dielectric film on one of the heat-conducting media 13 and appropriately machining the housing slightly larger than the thickness of the crystal 12 (by 0.00025 inches). The crystal 12 is placed against the film on one side and since the housing 11 is slightly larger than the crystal 12, when the second heat-conducting medium 13 is placed in contact with the housing 11, the second gap 15 is formed. Consequently, in this last-described arrangement a second shim 14 is not needed.

Figure 3:
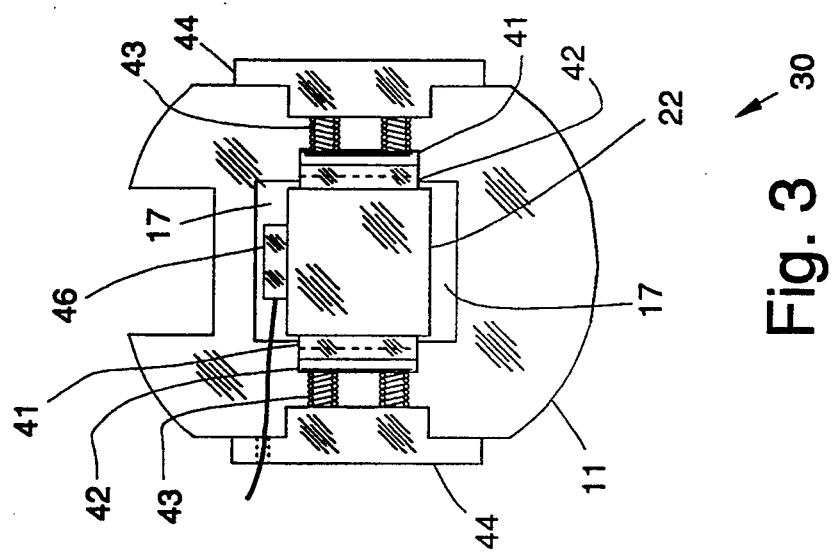
FIG. 3 shows a second partial cutaway diagram of the laser crystal module of FIG. 2.
Figure 2:
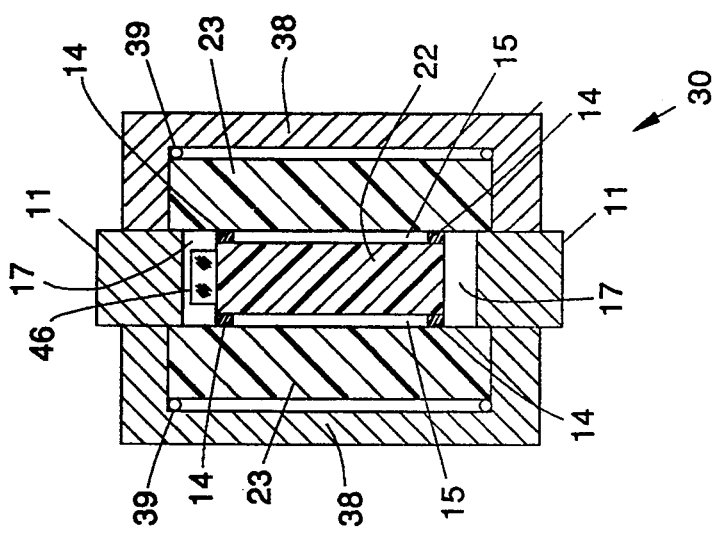
FIG. 2 shows a partial cutaway diagram of a laser crystal module that forms part of a laser system that incorporates conductive face cooling in accordance with the principles of the present invention.

An optical device incorporating the heat removal principles of the present invention has been reduced to practice. The device that was built and tested comprised two second harmonic generation (SHG) modules 30, each using a KTiOPO$_4$ (KTP) crystal as a nonlinear medium. Two different cross sectional diagrams of one of these modules 30 are shown in FIGS. 2 and 3. FIG. 2 shows a partial cutaway diagram of a laser crystal module 30 that forms part of a laser system that incorporates the cooling technique in accordance with the principles of the present invention, while FIG. 3 shows a second partial cutaway diagram of the laser crystal module 30 of FIG. 2.

The KTP crystal 22 is disposed in an aluminum housing 11 and two small air gaps 15 are located at the interface between the crystal 22 and sapphire plates 23 disposed on either side of the crystal 22. The sapphire plates 23 are secured to the housing 11 by means of two retainers 38 that are secured to the housing 11 by screws, for example. Two O-rings 39 are disposed between the retainers 38 and the sapphire windows 23. Resistive heaters 41 and heat spreaders 42 are secured by means of springs 43 and cover plates 44 and screws, for example, to the housing that are employed to heat the KTP crystal 23 to a predetermined temperature. A temperature sensor 46 is employed in a feedback control loop to control the temperature of the KTP crystal 23.

Internally generated heat from the crystal 22 is conducted through the small air gaps 15 to the sapphire plates 23. The sapphire plates 23 then conduct the heat to the aluminum housing 11, and by means of heat pipes or other means (not shown), to an external cold plate (not shown).

The effect of this cooling method was theoretically verified using finite element thermal analysis. In the case where a traditional method of transverse heat conduction is used, the thermal gradient $\Delta T$ developed across the crystal 22 is estimated by $\Delta T = \alpha P/4\pi K = 8°$ C., where $\alpha = 0.06$/cm is the absorption coefficient, $P = 50W$ is the power in an applied laser beam, and $K = 0.03 W/cm/°C$. is the thermal conductivity of the KTP crystal 22. This is far in excess of the approximately 2° limitation on the thermal gradient that is desired to maintain efficient frequency conversion. However, using the approach of face-cooling in accordance with the principles of the present invention, the finite element thermal model shows that this requirement is met.

This device including two SHG modules 30 was tested. No degradation in performance was seen under 20Hz operation, whereas in prior tests not using this thermal management approach there was a 10% degradation due to the onset of thermal gradients within the module 30.

Thus there has been described new and improved conductive face-cooled optical elements for use in high power laser systems. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. An optical device for use in a laser system, said optical device comprising:
   a heat conducting housing;
   an optical transmissive optical element having first and second surfaces disposed in the housing for propagating laser energy in a direction substantially transverse to the plane of said first and second surfaces; and
   first and second optically transmissive windows that comprise optically transmissive heat sinks, each window disposed adjacent to and space apart from said respective first and second surfaces of the optically transmissive optical element by first and second gaps;

whereby heat generated in the optical element is passively conducted to said first and second optically transmissive windows by said gaps in a direction parallel to the direction of laser energy propagation and then to the housing.

2. The optical device of claim 1 further comprising a gas-filled gap disposed between said optical element and said first and second optically transmissive windows.

3. The optical device of claim 2 wherein said gas-filled gap comprises a dielectric film having the thickness of the gap depositing on one of the said optically transmissive windows adjacent the periphery of the optical element, and wherein the other said gas-filled gap comprises a gap formed by machining the housing slightly larger than the thickness of the optical element.

4. The optical device of claim 1 wherein each said gap is formed by disposing a spacer between the optical element and each said optically transmissive window.

5. The optical device of claim 4 wherein said spacer comprises a dielectric shim.

6. The optical device of claim 4 wherein said spacer comprises a vacuum-deposited dielectric film.

7. The optical device of claim 1 wherein the optical element comprises a laser crystal.

8. The optical device of claim 1 wherein the optical element comprises a nonlinear frequency conversion crystal.

9. The optical device of claim 8 wherein the nonlinear frequency conversion crystal comprises a $KTiOPO_4$ (KTP) crystal.

10. The optical device of claim 1 wherein said first and second optically transmissive windows each comprise sapphire windows.

11. The optical device of claim 1 further comprising:
a resistive heater and heat spreader coupled to the housing for heating the optical element to a predetermined temperature.

12. The optical device of claim 11 further comprising:
a temperature sensor disposed adjacent to said optical element that is employed in a feedback control loop to control the temperature of said optical element.

13. A laser system comprising:
a heat conducting housing;
an optically transmissive element having first and second surfaces disposed in the housing for propagating laser energy in a direction substantially transverse to the first and second surfaces;
first and second optically transmissive windows comprised of optically transmissive heat sinks, each said window disposed adjacent to, but spaced apart from said respective first and second surfaces of said optical element by first and second gaps;
whereby heat generated in said optical element is passively conducted to said first and second optically transmissive windows by said gaps in a direction parallel to the direction of said laser system energy propagation.

14. An optical device for use in a laser system, said optical device comprising:
a heat conducting housing;
an optically transmissive optical element having first and second surfaces disposed in the housing for propagating laser energy in a direction substantially transverse to the plane of said first and second surfaces;
first and second optically transmissive windows that comprise optically transmissive heat sinks, said windows being disposed in contact with respective surfaces of the optical element, wherein heat generated in the optical element is passively conducted to said first and second windows in a direction parallel to said direction of propagating laser energy.

15. The optical device of claim 14 further comprising:
a resistive heater and heat spreader coupled to said housing for heating said optical element to a predetermined temperature.

16. The optical device of claim 15 further comprising:
a temperature sensor disposed adjacent to said optical element that is employed in a feedback control loop to control the temperature of said optical element.

17. The optical device of claim 14 wherein said first and second optically transmissive windows each comprise sapphire windows.

18. The optical device of claim 14 wherein said optical element includes a non-linear frequency conversion crystal.

* * * * *